(12) United States Patent
Erden et al.

(10) Patent No.: US 7,265,937 B1
(45) Date of Patent: Sep. 4, 2007

(54) POSITIONING OF A HEAD ARRAY OVER A DATA STORAGE MEDIUM

(75) Inventors: Mehmet F. Erden, Pittsburgh, PA (US); Mark D. Bedillion, Allison Park, PA (US); Erozan M. Kurtas, Pittsburgh, PA (US); Xueshi Yang, Pittsburgh, PA (US); Darren W. Karns, Evans City, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/450,208

(22) Filed: Jun. 9, 2006

(51) Int. Cl.
*G11B 5/596* (2006.01)
(52) U.S. Cl. .................................. 360/78.14
(58) Field of Classification Search ............. 360/78.14, 360/78.04, 78.09, 75, 77.08, 77.11; 329/362
See application file for complete search history.

(56) References Cited

U.S. PATENT DOCUMENTS

| | | | |
|---|---|---|---|
| 4,426,623 A * | 1/1984 | Wilkens et al. ............. | 329/362 |
| 6,057,977 A * | 5/2000 | Cunningham ............ | 360/77.08 |
| 6,760,184 B1 * | 7/2004 | Cunningham ............ | 360/77.08 |
| 6,760,185 B1 * | 7/2004 | Roth et al. ................ | 360/77.08 |
| 7,009,802 B1 * | 3/2006 | Ehrlich ........................ | 360/75 |
| 7,026,676 B2 | 4/2006 | Ahner et al. ................ | 257/295 |
| 7,061,708 B2 * | 6/2006 | Ehrlich et al. ................ | 360/75 |
| 7,061,709 B2 * | 6/2006 | Oki ............................ | 360/75 |
| 7,085,093 B2 * | 8/2006 | Oki ............................ | 360/75 |
| 7,099,108 B2 * | 8/2006 | Zayas ......................... | 360/75 |
| 7,116,511 B2 * | 10/2006 | Ehrlich ........................ | 360/75 |
| 7,133,240 B2 * | 11/2006 | Ehrlich et al. ................ | 360/75 |
| 7,206,157 B2 * | 4/2007 | Ehrlich ........................ | 360/75 |
| 2004/0071924 A1 | 4/2004 | Yang et al. ................ | 428/65.3 |
| 2006/0215306 A1 * | 9/2006 | Ehrlich et al. ................ | 360/75 |

\* cited by examiner

*Primary Examiner*—Fred F. Tzeng
(74) *Attorney, Agent, or Firm*—Westman, Champlin & Kelly

(57) ABSTRACT

A data storage system in which multiple readback signals are resolved is provided. The data storage system includes a data storage medium configured to store servo marks and data marks. The data storage medium has tracks that are divided into sectors. An array of heads is configured to interact with the data storage medium. A demodulation circuit receives servo signals obtained by at least some heads of the array of heads and computes a resultant servo signal, which is used to adjust a position of the array of heads over the storage medium.

20 Claims, 11 Drawing Sheets

POSITIONING OF A HEAD ARRAY OVER A DATA STORAGE MEDIUM

FIELD OF THE INVENTION

The present invention relates generally to data storage devices, and more particularly but not by limitation to positioning of a head array over a storage medium in a data storage device.

BACKGROUND OF THE INVENTION

In data storage systems, digital data are written to and read from data storage surfaces. One type of data storage system is a disc drive, which reads and writes information along concentric tracks formed on discs. Read and write operations are performed through a transducer which is typically carried on a slider body. The slider and the transducer are sometimes collectively referred to as a head, and typically a single head is associated with each data storage surface. To locate a particular track on a disc, disc drives typically use embedded servo fields on the disc. These embedded fields are utilized by a servo subsystem to position a head over a particular track. In a disc drive, the servo subsystem includes a controller that is attached to the head to control its spatial position by moving it according to its input Position Error Signal (PES). The PES is etracted from a head output signal or readback signal with the help of a demodulator block or ciruit As mentioned above, in a disc drive, a single head is typically associated with each data storage surface. Thus a disc drive demodulator needs to etract the PES from only a single readback signal. In the near future, manufactured data storage devices will include multiple probe heads (or tips), supported by a single arm, that read information from or write information to a data storage surface. At any given time, all or some of the tips will be active, resulting in more than one readback signal.

Thus, there is a need for a servo demodulation system that is that is capable of resolving multiple readback signals.

SUMMARY OF THE INVENTION

The present embodiments relate to data storage systems that include servo demodulation systems, which address the above-mentioned need.

A data storage system in which multiple readback signals are resolved is provided. The data storage system includes a data storage medium configured to store servo marks and data marks. The data storage medium has tracks that are divided into sectors. An array of heads is configured to interact with the data storage medium. A demodulation circuit receives servo signals obtained by at least some heads of the array of heads and computes a resultant servo signal, which is used to adjust a position of the array of heads over the storage medium.

These and other features and benefits that characterize embodiments of the present invention will be apparent upon reading the following detailed description and review of the associated drawings.

BRIEF DESCRIPTION OF THE DRAWINGS

FIGS. 6, 7-1 and 7-2 are simplified block diagrams of example probe storage architectures, which do not rely on absolute sensors and utilize permanent servo marks.

FIGS. 12-1 and 12-2 are simplified block diagrams of example probe storage architectures, which rely on absolute sensors and utilize embedded servo sectors with permanent servo marks.

FIGS. 13, 14-1 and 14-2 are simplified block diagrams of example probe storage architectures, which utilize servo sectors written by erase readback marks.

FIGS. 18-1 and 18-2 are simplified block diagrams of a servo sector fields written to erase readback marks in the probe storage architectures of FIGS. 15 and 16.

DETAILED DESCRIPTION OF ILLUSTRATIVE EMBODIMENTS

In the embodiments described below in connection with FIGS. 1-20, a data storage system includes a data storage medium configured to store servo marks and data marks. The data storage medium has tracks that are divided into sectors. An array of heads is configured to interact with the data storage medium. A demodulation circuit receives servo signals obtained by at least some heads of the array of heads and computes a resultant servo signal, which is used to adjust a position of the array of heads over the storage medium.

Figure 1:
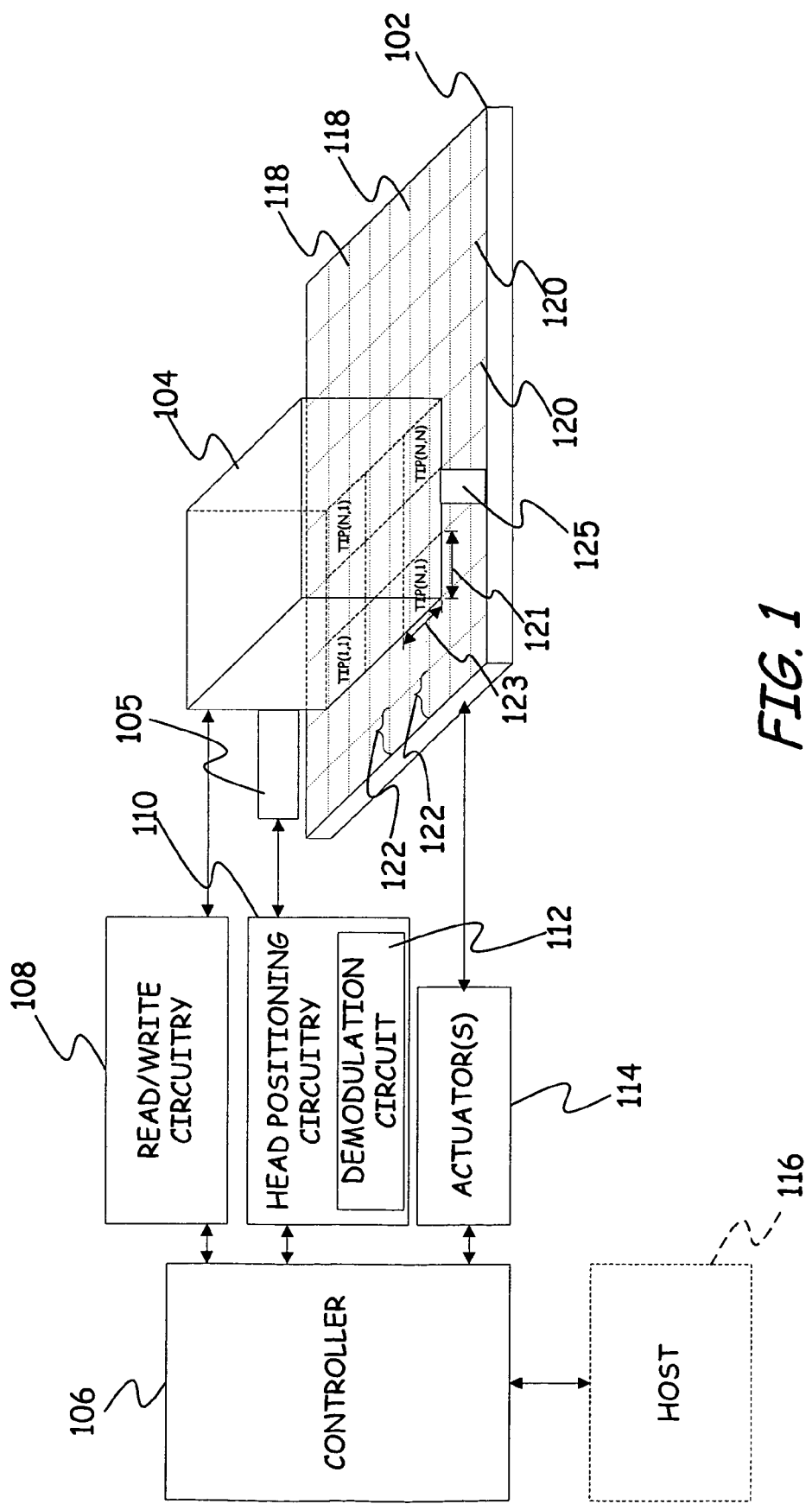
FIG. 1 is a simplified block diagram of a data storage system in accordance with one of the present embodiments.

FIG. 1 is a simplified block diagram of a data storage system 100, which includes a head-positioning circuit having a demodulation circuit that computes a resultant servo signal in accordance with one of the present embodiments. System 100 includes a data storage medium 102 and a head-array 104 (also referred to as a probe) that communicates data to and from data storage medium 102. Individual heads (or probe tips) of the array of heads 102 are represented by TIP(1,1), TIP(N,1), TIP(1,N), etc., in FIG. 1. System 100 is also referred to as a probe storage system. In system 100, head array 104 is supported by a single arm 105, for example. Other primary components of system 100 include a controller 106, read/write circuitry 108, head positioning circuitry 110, which includes demodulation circuitry 112, and actuators 114.

Controller 106 coordinates and controls the operation of components 108, 110 and 114 and also receives data from and sends data to host system 116. Host system 106 can include a microprocessor-based data processing system such as a personal computer or other system capable of performing a sequence of logical operations. Read/write circuitry 108 helps convert data received from host system 116 into a form suitable for writing on medium 102. Also, circuitry 108 helps convert data read by head array 104 into a form suitable for communication to host 116. Actuator(s) 114 help provide relative scanning motion between data storage medium 102 and head-array 104 by moving medium 102 along the x-axis and/or the y-axis, for example. To aid in positioning head array 104 and to help provide organized storage of user data, data storage medium 102 includes a number of tracks, which are represented by horizontal dotted lines 118 in FIG. 1. Tracks 118 are divided into smaller units or sectors. In FIG. 1, boundaries between sectors are represented by dotted lines 120. It should be noted that each tip, along its width 121, can span more than a sector length (distance between any two adjacent dotted lines 120). In some embodiments, each segment/area 122 (area of medium 102 spanned by tips, along tip width 121) can include both position information (servo marks) and user data (data marks). In some embodiments, dedicated tips that only read and/or write servo marks (producing dedicated servo sectors) and dedicated data tips that only read/write data marks (producing dedicated data sectors) are used. Servo and/or data marks can be either permanent or erased on readback (if medium 102 is ferroelectric, for example).

Since, at any given time, servo information is read by more than one head or probe tip of head-array 104, the multiple servo signals have to be resolved into a single signal for circuitry 108 to properly position head-array 104 over a target location (for example, target track(s)) on medium 102. In accordance with the present embodiments, the resolution of the multiple signals is carried out by demodulation circuitry 112, which is described in detail further below. Also, as will be apparent from the description further below, demodulation techniques differ based on materials used for medium 102, types of servo mark and data mark arrangements on medium 102, etc.

In general, demodulation in a servo loop should be simple to implement, yet effective to locate heads at track centers during writing or reading of data tracks. This is typically satisfied by designing functions/components of a servo demodulation architecture together with its input pattern, i.e., the servo sector format Some of the present embodiments, which are described further below, employ servo patterns that are similar to those employed in disc drives. Therefore, a disc drive data storage system and a servo system suitable for a disc drive are first described below in connection with FIGS. 2 through 5, and thereafter different embodiments are described in connection with FIGS. 6-20.

Figure 2:
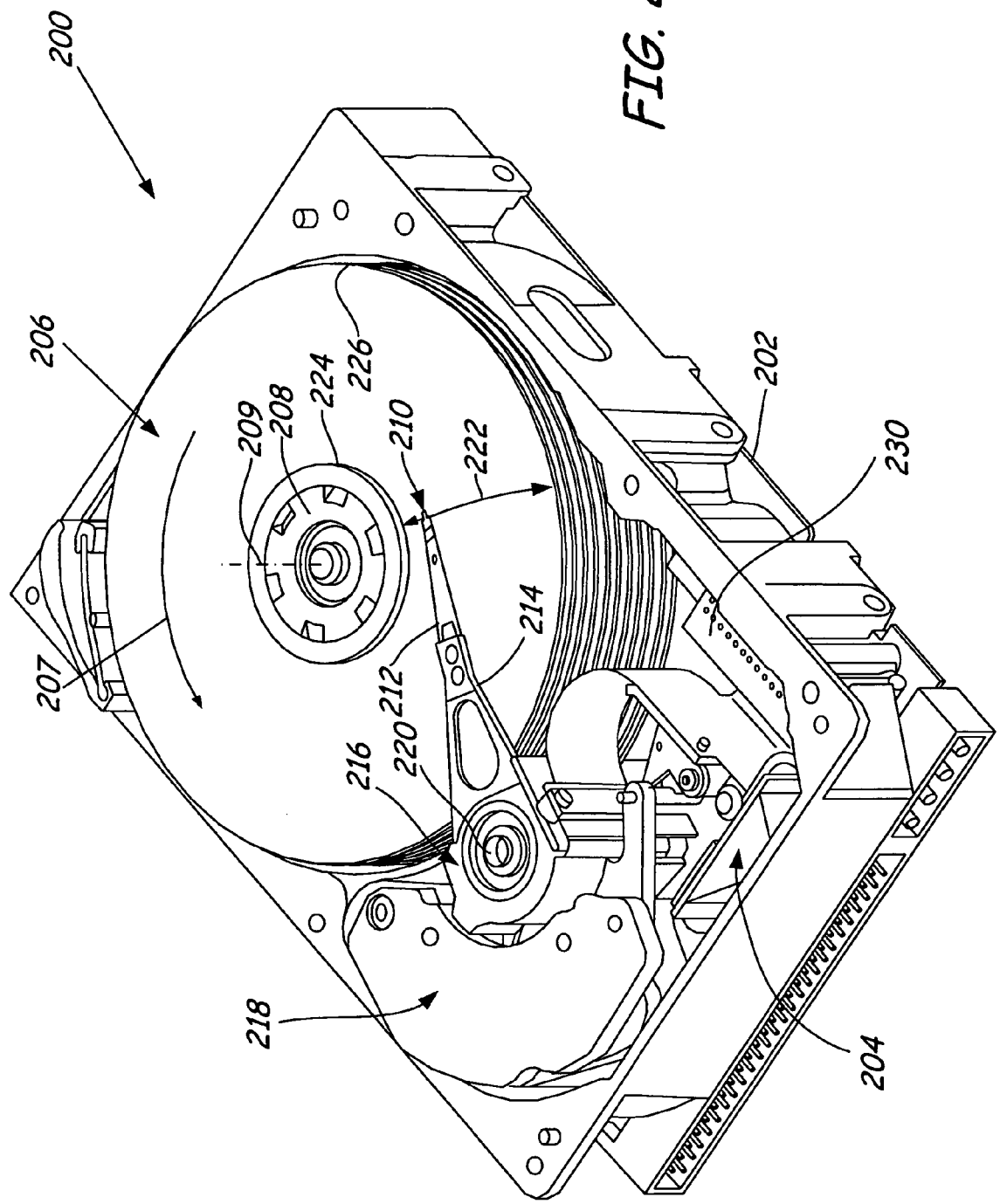
FIG. 2 is an isometric view of a disc drive data storage system.

FIG. 2 is an isometric view of a disc drive 200. Disc drive 200 includes a housing with a base 202 and a top cover (not shown). Disc drive 200 further includes a disc pack 206, which is mounted on a spindle motor (not shown) by a disc clamp 208. Disc pack 206 includes a plurality of individual discs, which are mounted for co-rotation about central axis 209. Each disc surface has an associated disc head slider 210 which is mounted to disc drive 200 for communication with the disc surface. In the example shown in FIG. 2, sliders 210 are supported by suspensions 212 which are in turn attached to track accessing arms 214 of an actuator 216. The actuator shown in FIG. 2 is of the type known as a rotary moving coil actuator and includes a voice coil motor (VCM), shown generally at 218. Voice coil motor 218 rotates actuator 216 with its attached heads 210 about a pivot shaft 220 to position heads 210 over a desired data track along an arcuate path 222 between a disc inner diameter 224 and a disc outer diameter 226. Voice coil motor 218 is driven by servo electronics 230 based on signals generated by heads 210 and a host computer (not shown). Details regarding servo control in a disc drive such as 200 are provided below in connection with FIGS. 3 through 5.

Figure 3:
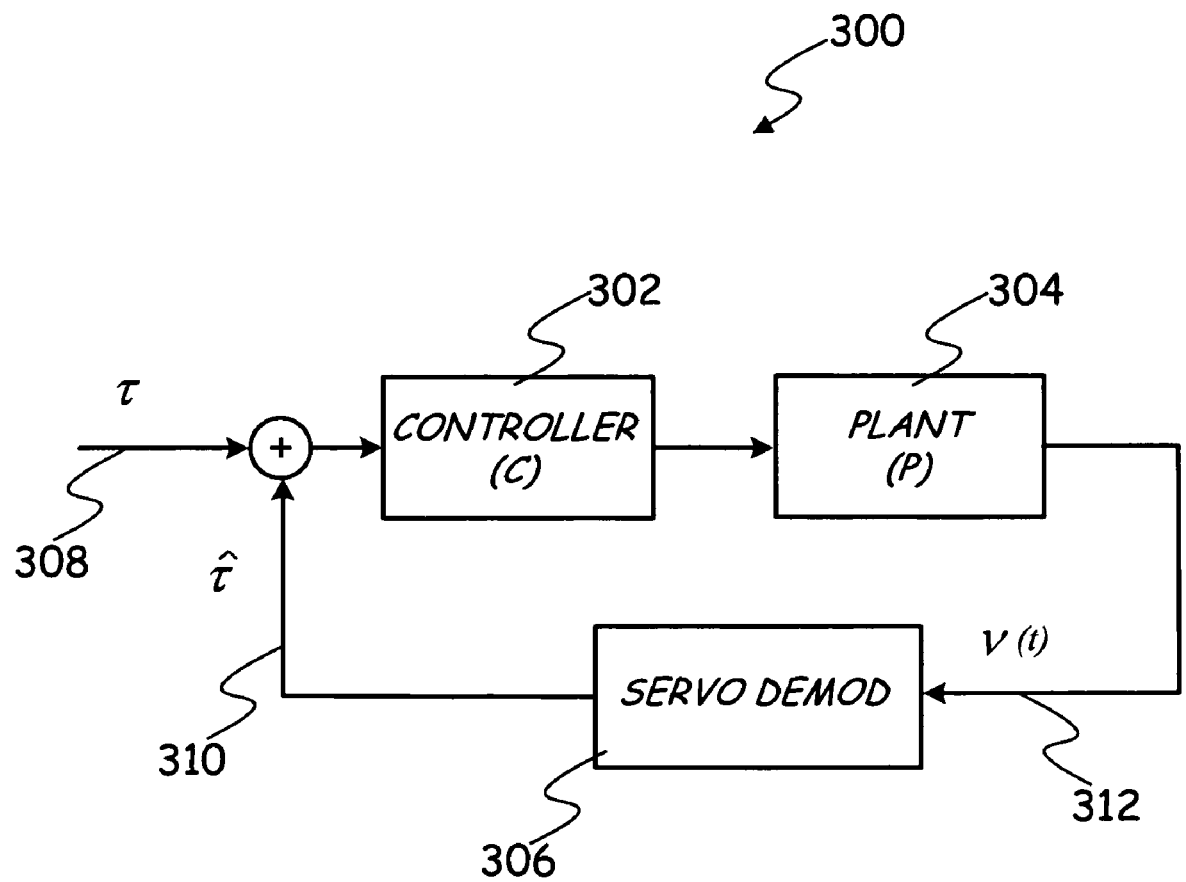
FIG. 3 is a simplified block diagram of a disc drive servo loop.

FIG. 3 is a simplified block diagram of a servo loop 300, which is suitable for use in a disc drive. Servo loop 300, in general, includes a controller (C) 302, a plant (P) 304 and a servo demodulation (servo demod) block 306. Controller block (C) controls the plant (P) to reduce a difference between a reference signal $\tau$ (represented by reference numeral 308 in FIG. 3) and its estimate $\hat{\tau}$ (represented by reference numeral 310 in FIG. 3). Servo demodulation block 306 demodulates position information in output $\upsilon(t)$ (represented by reference numeral 312 in FIG. 3) to extract the estimate of the reference position signal $\tau$. In a disc drive such as 200 (FIG. 2), controller (C) is attached to a head (such as 210 (FIG. 2)) to control its spatial position by moving it according to its input position error signal (PES). Plant (P) represents the recording system whose output $\upsilon(t)$ will be a readback signal corresponding to servo specific position information. Reference signal $\tau$ is usually set to zero for track center, but may be other than zero if an offset is required. Demodulator block 306 extracts the PES information within $\upsilon(t)$, and outputs $\hat{\tau}$ as anestimate of $\tau$. Details regarding demodulation in a disc drive servo loop are provided below in connection with FIGS. 4 and 5.

Figure 4:
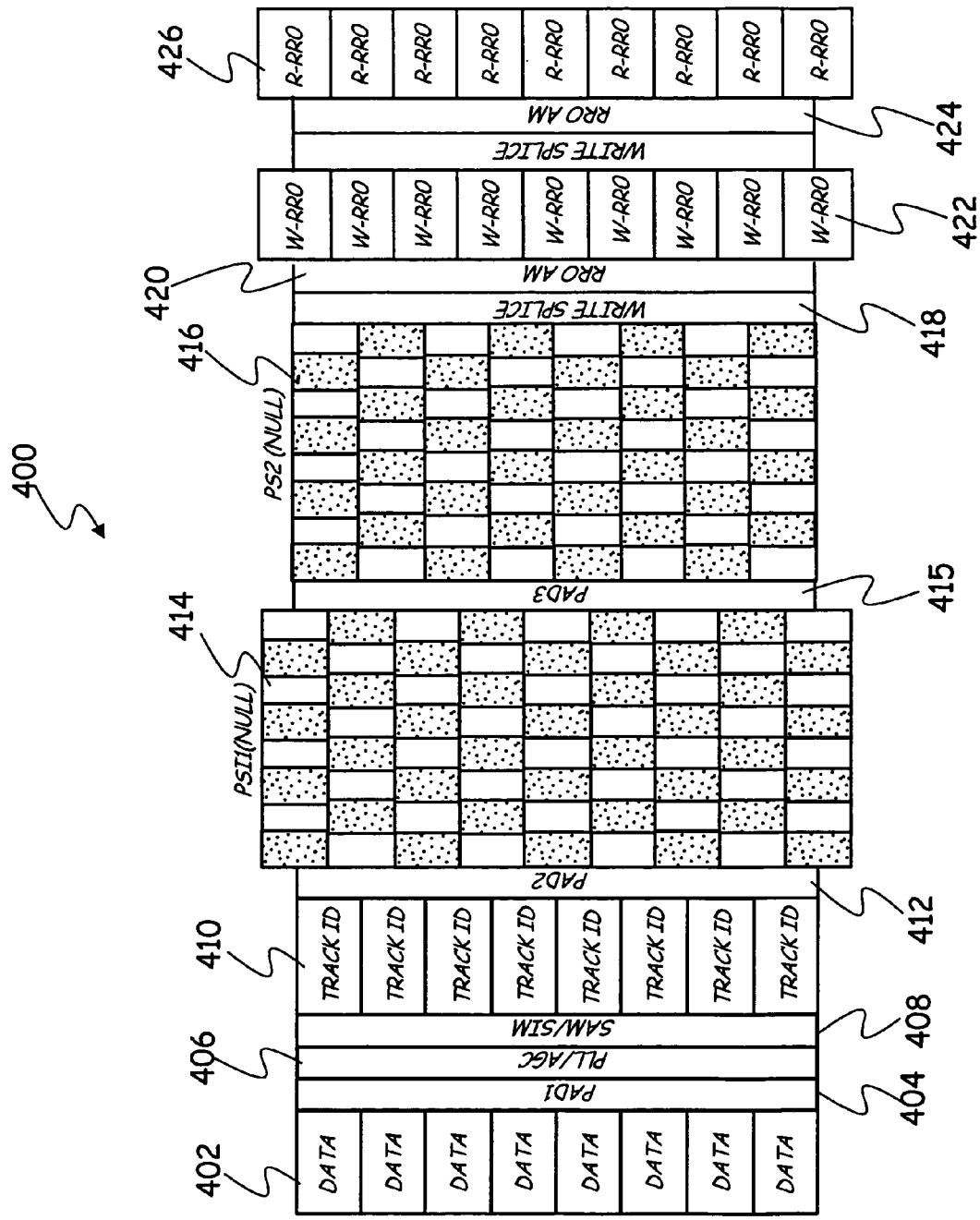
FIG. 4 is a simplified block diagram showing an example servo sector format.

In disc drive data storage systems (such as 200 (FIG. 2)), sector servo (or embedded servo) architecture is assumed with a servo sector format 400 shown in FIG. 4. A readback signal corresponding to each servo sector field, in the format shown in FIG. 4, is processed by a servo demodulator 500 having a top level architecture as shown in FIG. 5.

Figure 5:
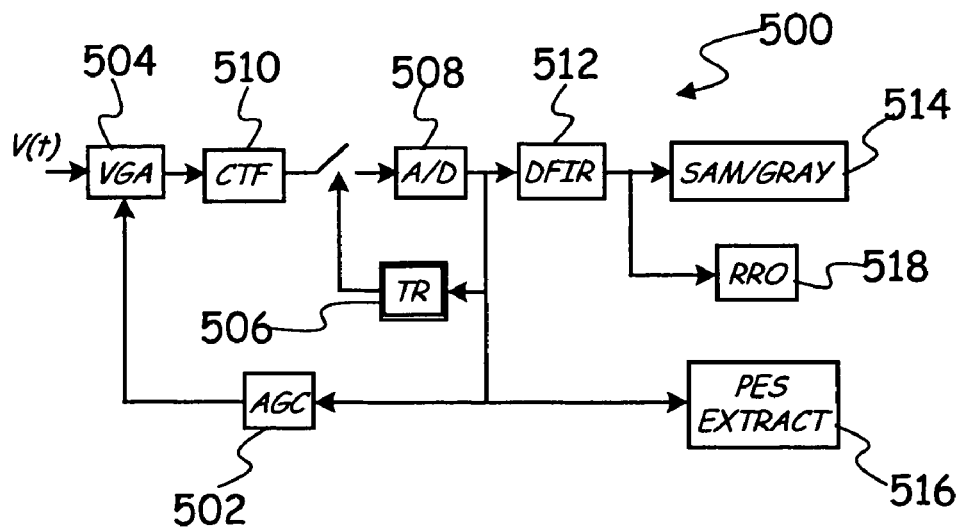
FIG. 5 is a simplified block diagram of an example servo demodulation block utilized in a disc drive.

In order to provide an understanding of the functionality of a disc drive servo demodulator, FIGS. 4 and 5 are described together. After data sectors 402 and a space (PAD1) 404 in FIG. 4, servo sector 400 starts with a phase locked loop/adaptive gain control (PLL/AGC) field 406. Written data in this field isthe same all along a cross-track direction. While information is being read from this field, Adaptive Gain Controller (AGC) 502 in FIG. 5 adjusts a gain of Variable Gain Analyzer (VGA) 504, and Timing Recovery (TR) block 506 recovers a phase and frequency offset for Analog-to-Digital (A/D) converter 508 to sample an analog signal at appropriate sampling instances. Information is then read from a SAM/SIM field 408 in FIG. 4, which stores the same data for Servo Address Mark (SAM) or Servo Index Mark (SIM) ina cross-track direction. With its already adjusted VGA and recovered sampling instances, and its fixed Continuous Time Filter (CTF) 510 and Digital Finite Impulse Response (DFIR) equalizer filter 512, the servo demodulator architecture 500 in FIG. 5 is ready to process samples of the readback signal corresponding to SAM/SIM field 408 in order to make sure that the VGA and TR blocks (504 and 506) are adjusted correctly. Once the SAM/SIM information is detected using a SAM/GRAY block 514, the servo demodulator 500 also detects a Track Identification (ID) with the same block using a readback signal corresponding to a Track ID field 410 in FIG. 4. Once the Track ID of the track of interest is detected, the servo system knows that the head is inthe vicinity of the particular track center. Following a space (PAD 2) 412 in the servo format, there are Position Signal (PS) bursts, Position Signal 1 (PS1) and Position Signal 2 (PS2) fields 414 and 416, separated by another space (PAD3) 415. Servo demodulator block 500 processes data in PS1 and PS2 in PES Fxtract block 516 in FIG. 3 to extract the Position Error Signal (PES). Using this signal, the servo system in FIG. 3 moves the head towards the center of the track of interest. After the PS2 field, is another space indicated by Write Splice 418 followed by a Repeatable Run Out (RRO) Address Mark (AM) 420. Once this address mark is detected with the help of SAM/GRAY block 514, the servo demodulator 500 utilizes RRO block 518 in FIG. 5 to detect an amount of RRO during a write process (W-RRO). WI-RRO is represented by reference numeral 422. Similarly, the servo demodulator 500 also gets RRO information during a read process (R-RRO) after detecting the RRO AM 424 and R-RRO fields 426 successfully. W-RRO and R-RRO information is then used during the write or read processes, respectively, to make the final adjustments on the head location against the RRO effects in the disc storage system before the head starts writing or reading data sectors.

As mentioned earlier, in a disc drive (such as 200 of FIG. 2), a single head is typically associated with each data storage surface. Thus, a disc drive demodulator (such as 500 (FIG. 5)) needs to extract the PES from only a single readback signal. However, in the data storage device of FIG. 1, a head array, supported by a single arm, is used to read information from or write information to a data storage medium. At any given time, all or some of the tips or heads of the head array will be active, resulting in more than one readback signal. As noted earlier, the present embodiments, in general, provide a servo demodulaton system that is capable of resolving multiple readback signals to produce a resultant servo signal that is used to adjust a position of the head array. Also, as mentioned above, demodulation techniques differ based on materials used for medium 102 (FIG. 1), types of servo mark and data mark arrangements on medium 102, etc. Different servo demodulation solutions and their associated servo sector formatting are described below. In figures for the different solutions provided below, servo fields are shaded and data field include no shading. Solution 1: Servo demodulation for probe storage with permanent servo marks which does not rely on absolute sensors As noted in the above subtitle, Solution 1 is proposed for probe storage architectures with permanent servo marks (i.e., the written servo information is not erased when it is read back from the medium). Further, no information from absolute sensors (any position sensors (for example, capacitive sensors) that measure the relative displacement between heads and a storage media) is utilized (i.e., absolute sensors (such as 125 (FIG. 1) are either absent from the head array, or their resolution or reliability is inadequate).

Figure 6:
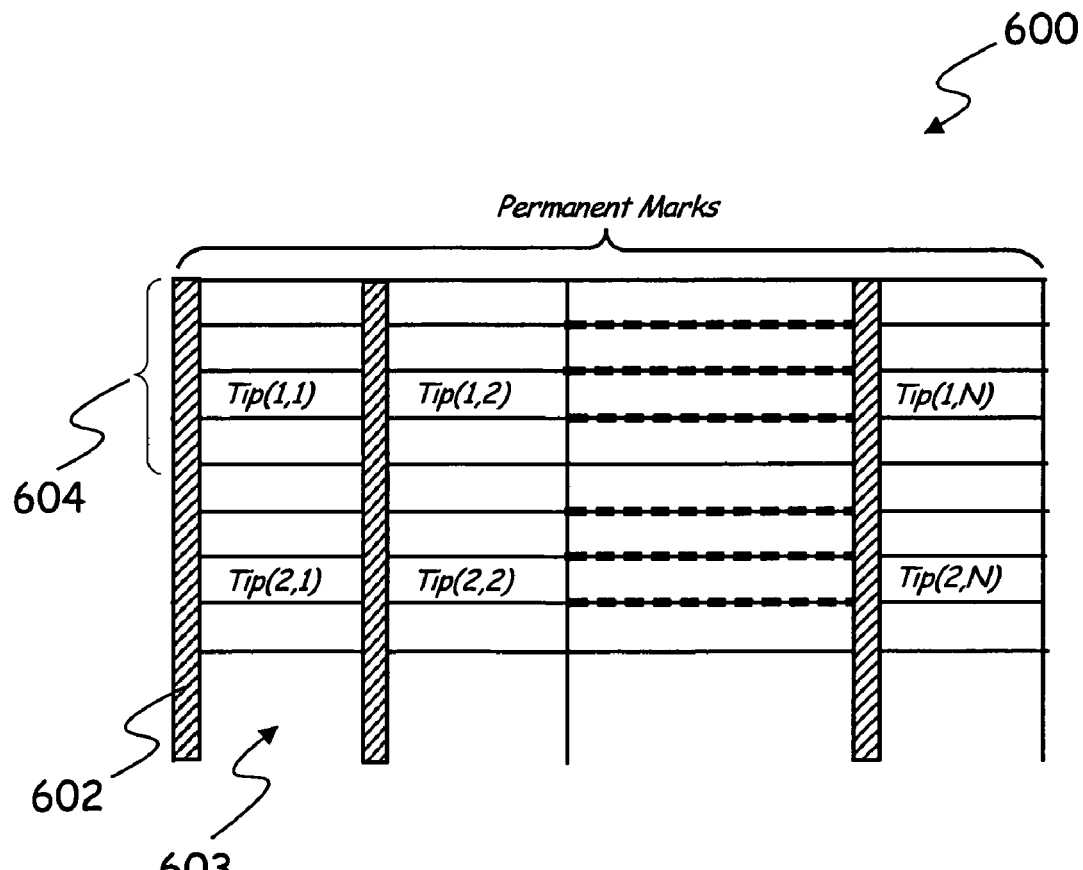
Figures 1, 7:
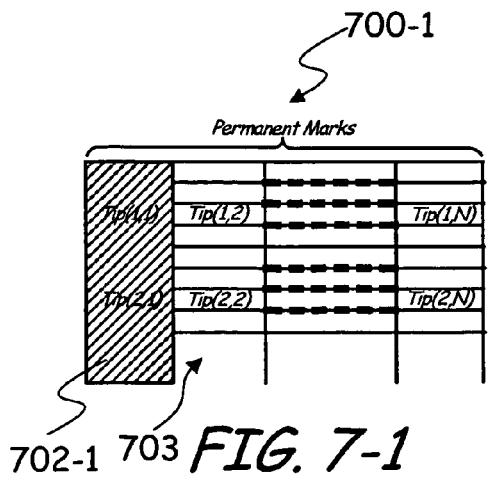
Figures 2, 7:
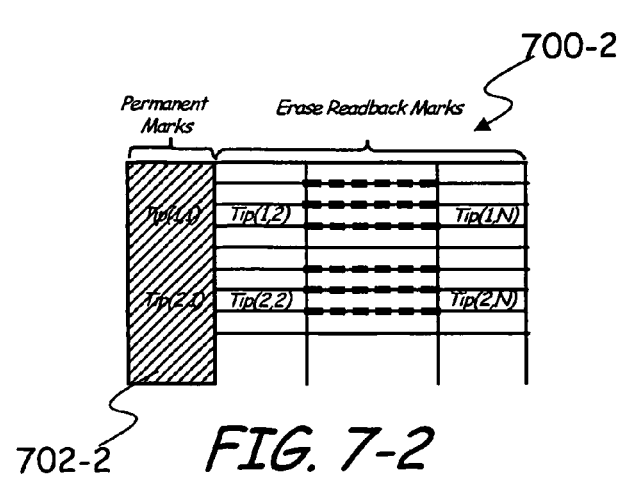

Some example probe architectures with permanent servo marks are shown in FIGS. 6 and 7. Architecture 700-1, 700-2 of FIG. 7 corresponds to servo marks 702-1, 702-2 which are written and read back using dedicated parts of the media and probe tips, while the architecture 600 in FIG. 6 corresponds to embedded servo marks 602 which can be written and read back by all the active probe tips. Reference numeral 604 indicates the number of tracks spanned by a single head/tip (such as tip (1,1)) along tip length 123 (FIG. 1). The difference between FIGS. 7-1 and 7-2 is, FIG. 7-1 corresponds to a uniform medium with permanent data and servo marks, while FIG. 7-2 has only permanent servo marks with erase readback data marks. Example data mark regions are represent by reference numerals 603 and 703 in FIGS. 6 and 7-1, respectively.

The example architedures shown in FIGS. 6 and 7, and many others which are not shown, have their own advantages and disadvantages. However, whichever one is chosen to be the envisioned architecure, the assumption is that the servo data is read from a permanent markby morethanone probe tip, and the absolute sensorfunctionality is not utilized. Servo demodulation in such embodiments can be carried out as follows:

1) The servo sector format shown in FIG. 4 is written to the sections of the probe media which are reserved for servo marks (i.e., the shaded areas in FIGS. 6 and 7).

2) The probe tips are discarded, ranked, and chosen according to a predefined scheduling algorithm. Then, the chosen and ranked probe tips are used for all subsequent servo operations. Any suitable technique can be employed to carry out this step.

3) A PLL/AGC field (such as 406 in FIG. 4) is first processed. An assumption is made that there is one VGA and AGC pair for each probe tip, and a gain of the VGA is adjusted for each tip separately. Sampling times are then adjusted using a timing recovery loop.

Figure 8:
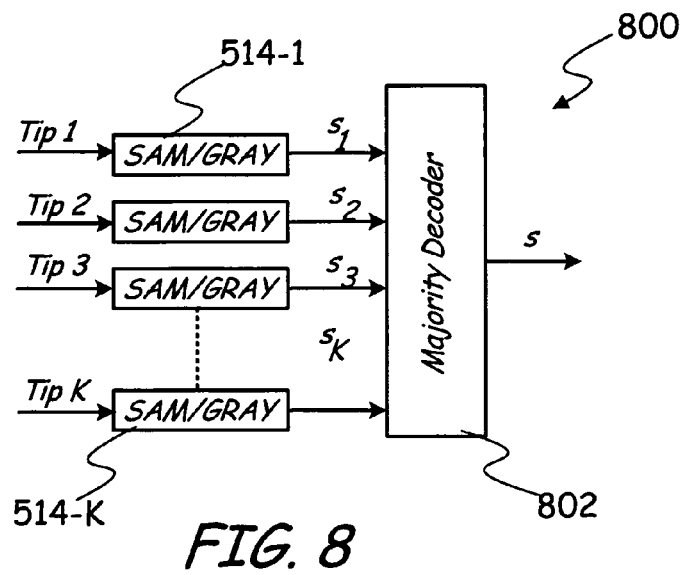
FIGS. 8, 9 and 10 are simplified block diagrams of servo demodulator components in a probe storage system.

4) As noted earlier, both SAM and SIM are needed in disc drives because the media are spinning and therefore a reference location needs to be found using SIM and then a count of how many SAMs are passed by before reaching a desired servo wedge needs to be obtained. However, in a probe scanning system (such as the system of FIG. 1) both SAM and SIM are not needed, and only SAM is sufficient SAM bits are detected using all active probe servo tips, and then majority decoding for the detected SAM bits is applied. The envisioned architecture 800 is shown in FIG. 8. In FIG. 8, each SAM/GRAY block 514-1 through 514-K corresponds to a unique probe tip with the same functionality of its counterpart disc drive recording (shown in FIG. 5). A Majority Decoder block 802 takes estimates $s_i$ for each tip i and applies majority decoding to find an overall estimate s. The functionality of Majority Decoder 802 can be described with the following equation $$s = \begin{cases} 1 & \text{if } \sum_{i=1}^{K} s_i > K/2 \\ 0 & \text{else} \end{cases} \quad \text{Equation 1}$$

5) Next, the probe tip assembly is positioned dose to ± half a track away from a center of a desed track. For this reason, a Track ID field (such as 410 in FIG. 4) is processed again using the architecture as shown in FIG. 8.

Figure 9:
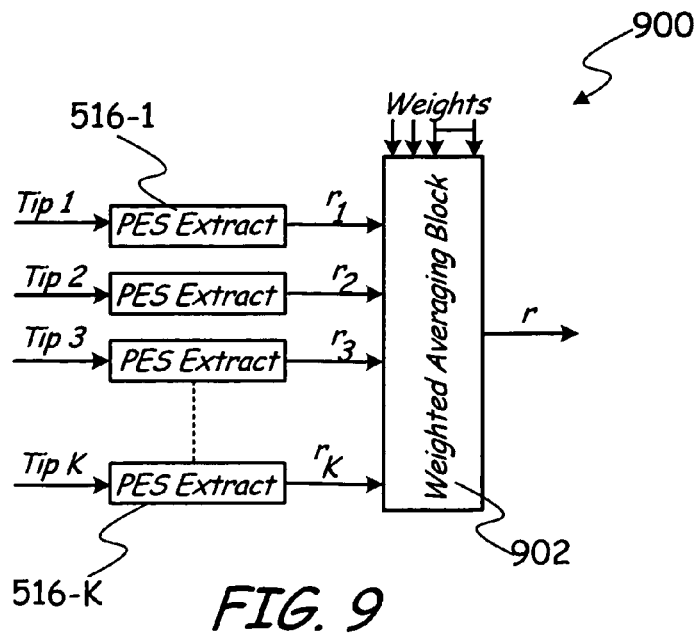

6) After the Track ID fields are processed, PS burst fields (such as 414 and 416 in FIG. 4) are processed to locate the head assembly closer to a center of a track of interest. For this purpose, PS1 (such as 414) is first processed to obtain $PES_n^i(\epsilon)$, and PS2 (such as 416) is processed to obtain $PES_q^i(\epsilon)$ for each probe tip i. Then, signals $PES_n^i(\epsilon)$ and $PES_q^i(\epsilon)$ are averaged over i to obtain one set of $PES_n(\epsilon)$ and $PES_q(\epsilon)$. The envisioned architecture 900 is shown in FIG. 9. In FIG. 9, if the head assembly is processing PS1 bursts, signals $r_i$ for each tip i correspond to $PES_n^i(\epsilon)$ represented by reference numerals 516-1 through 515-K); similarly if it is PS2 bursts, they correspond to $PES_q^i(\epsilon)$. Then, a weighted averaging block 902 is used to increase the reliability of the final $PES_n(\epsilon)$ and $PES_q(\epsilon)$ signals. Any suitable method can be utilized to find the weights in FIG. 9.

Figure 10:
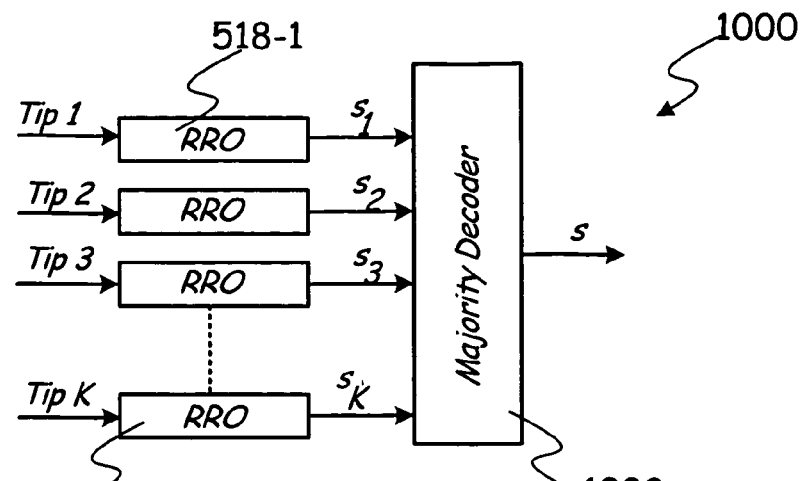

7) Finally, RRO fields are processed using the architecture 1000 in FIG. 10. RRO blocks 518-1 through 518-K in FIG. 10 carry out the same functions as block 518 shown in FIG. 5, which detects RRO field information written on the media. Other than the use of multiple RRO blocks, this architecture is substantially similar to that shown in FIG. 8, which also employs a Majority Decoder. The Majority Decoder in FIG. 10 is represented by reference numeral 1002.

Figure 11:
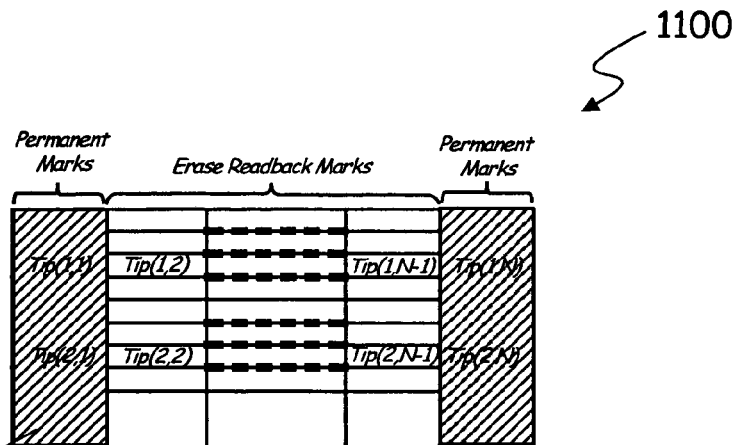
FIG. 11 is a simplified block diagram of an example probe storage architecture, which does not rely on absolute sensors, and utilizes permanent servo marks and erase readback data marks.
Figure 12:
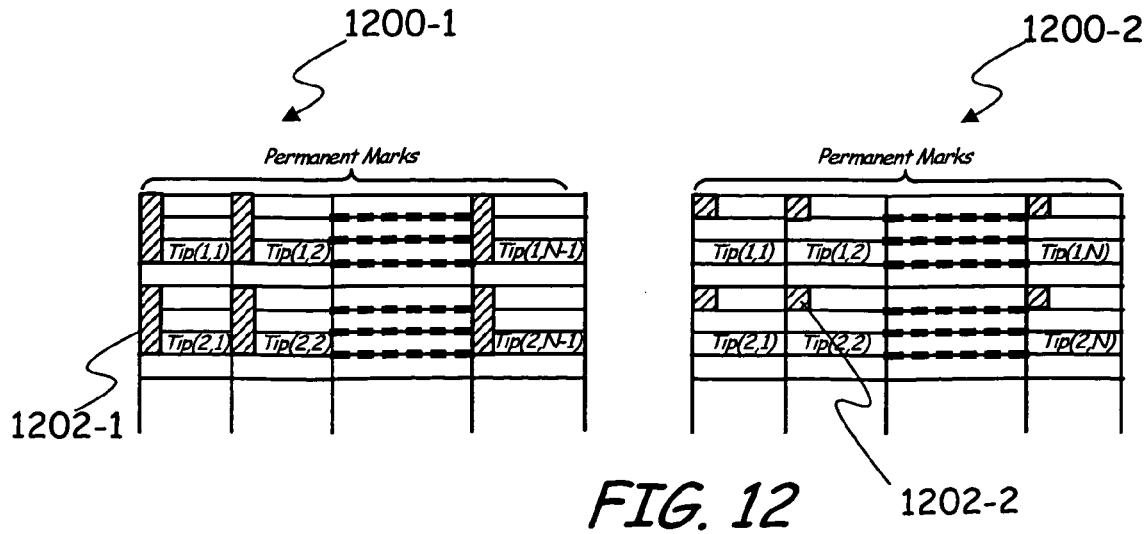
Figure 13:
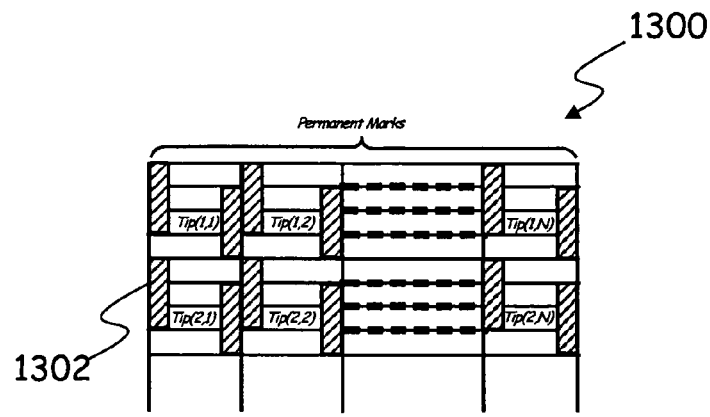

The probe storage architecture in FIG. 7-2 has erase readback marks for the data sectors, which therefore have to be written back after reading. Before writing to those data sectors, refining the servo information might help the system reliability. Thus, in some embodiments, servo sectors may be repeated at the end of scanning as shown in FIG. 11. In FIG. 11, the probe architecture is represented by reference numeral 1100 and the servo marks are represented by reference numeral 1102. These servo marks can be visualized as the mirror image of the ones located at the beginning of scanning. Once the servo information is retrieved using the extra servo marks at the end with the help of the methods described above, the user data is written while traveling in reverse direction relative to the reading direction. The servo marks at the end of scanning help recover any servo positioning changes in the system before writing, including the rotational changes, before writing the ease readback marks back to the media. However, this may come with a reduction in format efficiency, which reduces available area for user data. Solution 2: Servo demodulation for probe storage with permanent servo marks which also utilizes absolute sensors Compared to the envisioned probe storage architecture described under Solution 1 above, the only difference in the architecture described in this sub-section the utilization of absolute sensors in the storage system to obtain additional servo information. The presence of the additional servo information makesthe probe architectures 1200-1 and 1200-2 in FIG. 12 also possible in addition to the ones shown in FIGS. 6 and 7. According to the precision obtained from the absolute sensors, the probe tip assembly may be placed within a few tracks away from the center of the track of interest (as shown in FIG. 12-2), or within half a track from the track center (as shown in FIG. 12-1). The role of the absolute ssorscan be seen as equivalent to a seeking phase in servo operations, which is achieved with the Track ID fields in disc drive architectures and in Solution 1 above for probe storage. The precision of absolute sensors not only helps reducing the required servo marks 1202-1, 1202-2 to be written on the media (thus increasing the format efficiency), but it also completely eliminates or reduces the necessary functionality required for detecting the Track ID fields in servo demodulation (i.e., it reduces the complexity of the servo demodulation block). Servo demodulation for probe storage systems with permanent servo marks, which also utilizes absolute sensors, can be carried out as follows:

1) The absolute sensors are used to position the tip assembly dosetothe center of the track of interest.

2) If the precision of the absolute sensors is adequate to place the tip assembly only within few tracks, short Track ID fields are employed in the servo sector format to further take the tip assembly from few tracks away to half a track away from the desired track center.

3) If the precision of the absolute sensors is already adequate to place the tip assembly within half a track away from the desired track center, Track ID fields are not employed in the servo sector format.

4) Steps 1 through 7 of Solution 1 above are then followed. If there is are no Track ID fields in the servo sectors, step 5 of Solution 1, which explains how to process the Track ID fields, is skipped.

Solution 3: Servo demodulation for probe storage with erase readback servo marks which also utilizes absolute sensors When the servo marks are written on erase readback media, the seeking phase in servo operations (i.e., trying to locate the head(s) within a margin of the desired track center) will be prohibitive without any help from absolute sensors. Thus, erase readback marks should be considered with absolute sensors.

Figures 1, 14:
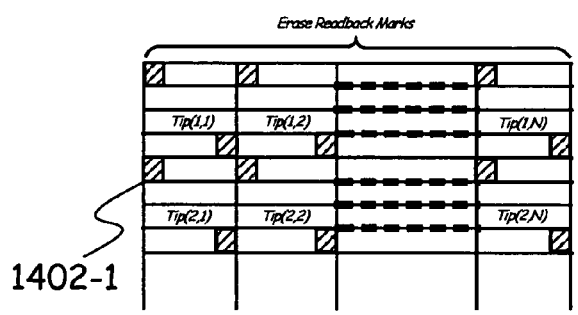
Figures 2, 14:
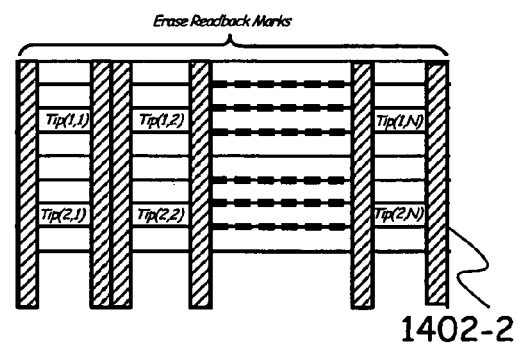

The possible probe architectures for this case can be very similar to their counterparts in FIGS. 6, 7, and 12, with the only difference being the type of the servo marks to be erase readback instead of permanent. With erase readback servo marks the servo information is erased upon reading and the erased marks have to be written back to the media. In an example configuration, the writing process is envisioned to be in the reverse direction with the reading direction (i.e., if the reading is carried out by scanning the probe media from left to right, then writing back is planned to be done from right to left). Then, at the end of reading back the data, another servo field may be needed to adjust the position of the tip assembly before starting to write the data back. Thus, the probe architecture example 1300, with servo marks 1302, shown in FIG. 13 can also be considered as an alternative. Depending on the precision of the absolute sensors, this may become one of the following in FIG. 14. The architecture 1400-1 in FIG. 14-1 requires high precision whereas the architecture 1400-2 of FIG. 14-2 needs less precision from the absolute sensor in the system. Servo marks in FIG. 14 are represented by reference numerals 1402-1 and 1402-2

The servo demodulation functions for this case are very similar to the ones itemized in Solution 2 above. The only difference is the servo marks here are erase readback, while in Solution 2 they are permanent. Thus, the servo tracks used for locating the probe tip assembly to the desired location have to be written back. Servo demodulation in such embodiments can be carried out as follows:

1) The steps in Solution 2 above are followed to retrieve the servo information, and the user data is read with that information.

2) At the end of the reading process, the servo information is retrieved again using the servo marks at the end of the range of each tip. The servo marks at the ends might not be necessary, and thus also this step, if the system does not lose its servo information at the end of the range. However, it is believed that this step makes the system more robust, thus increasing the system reliability from a servo point of view.

3) The user data and the servo information is written aligned with that particular data track while traveling in reverse direction relative to the reading direction.

4) The servo information is retrieved again at the end of writing process, and the head assembly is shifted half a track and the erased servo information is written at half track away from the original data track.

5) Step 4 is repeated until all the erased servo marks are written back.

The number of passes to write all the erased servo marks directly depends on the precision of the absolute sensors. Thus, the more precise the absolute sensors are, the less the number of required passes, resulting is less system cost. Solution 4: Servo demodulation for probe storage with both permanent and erase readback servo marks which also utilizes absolute sensors.

For probe storage which utilizes both the permanent and erase readback marks, the Track ID information is envisioned to be placed on the permanent marks. Thus, having absolute sensors, or not, only affects the length of the Track ID fields. Therefore, in this sub-section, the case where absolute sensors are included has been considered. However, in case no absolute sensors are present in the system, the Track ID fields, as described above in connection with FIG. 2, can be used to replace the functionality of the absolute sensors. The possibility of using both erase readback and permanent marks provides a number of options in terms of arranging the servo sectors fields between erase readback and permanent marks. Most of the servo sector fields can be placed on permanent marks in one embodiment, while in other embodiments, a choice can be made to utilize more servo fields as erase readback marks. This difference also acts the servo demodulation architecture, and there are more servo demodulation blocks for the embodiments discussed under this sub-section. However, all of these embodiments are a combination of Solutions 1, 2 and 3 discussed above. However, in order to illustrate the similarities and differences of the previous solutions with one of the alternative architectures addressed in this section, one specific example is provided and the servo demodulation functions associated the specific example are described below.

Figure 15:
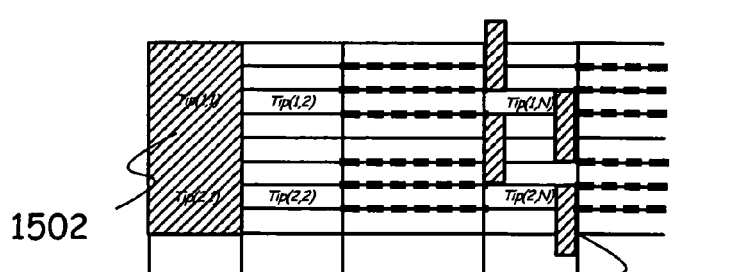
FIGS. 15 and 16 are simplified block diagrams of example probe storage architectures that utilize a combination of permanent and erase readback servo marks.
Figure 16:
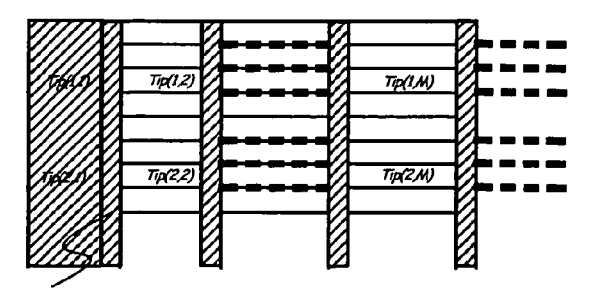

In this example, it is assumed that the probe architedure 1500 is as shown in FIG. 15. In this architecture, it is proposed that servo fields be written to both permanent marks 1502 and to erase readback marks 1504. Servo fields need not be written to the beginning of each probe tip which reads from erase readback marks, rather servo fields can be written at every other M tips, where M depends on the amount of impurities, such as thermal expansions, in the data storage system. In addition to this, it is assumed that each erase readback servo sector spans three tracks as shown in FIG. 15. If more robustness is need in the system regarding the erase readback marks, the erase readback servo marks can be increased as shown in FIG. 16, which illustrates probe architecture 1600. Three tracks per tip per operation are needed for this example, but if those erase readback marks are, for any reason, erased, then more redundancy is present in FIG. 16 to complete the servo operations and rewrite the erased servo marks 1602. However, this increased robustness comes with loss in servo format efficiency.

The distribution of the servo sector fields is carried out assuming that the servo position error signal obtained from the permanent marks will be sufficient in the absence of system distortions, which change the tip positions relative to each other, like thermal expansions. The patches on the erase readback marks will then correct the deviation resulting from distortions like thermal expansions.

Figure 17:
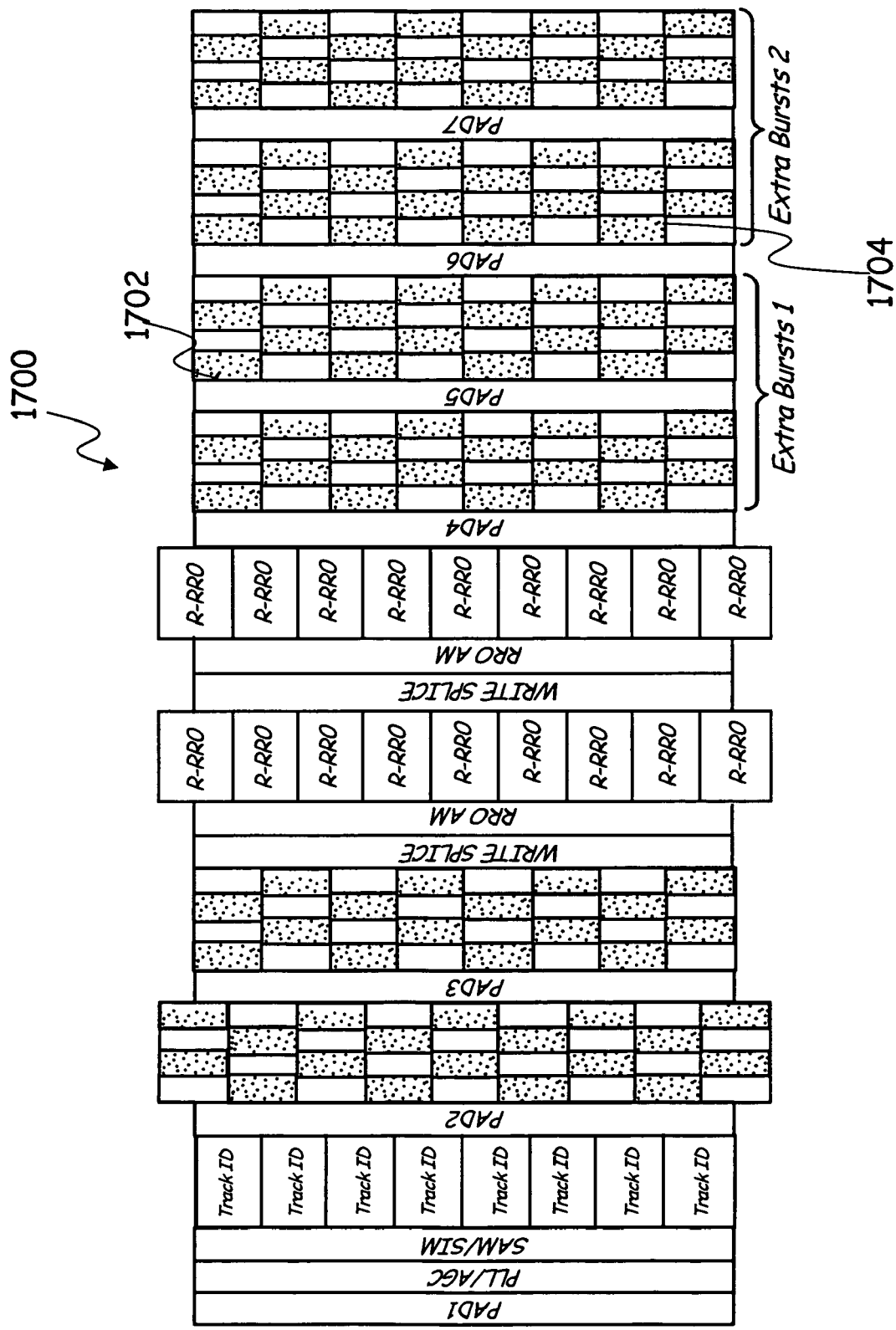
FIG. 17 is a simplified block diagram of a servo sector field written to permanent marks in the probe storage architectures of FIGS. 15 and 16.
Figures 1, 18:
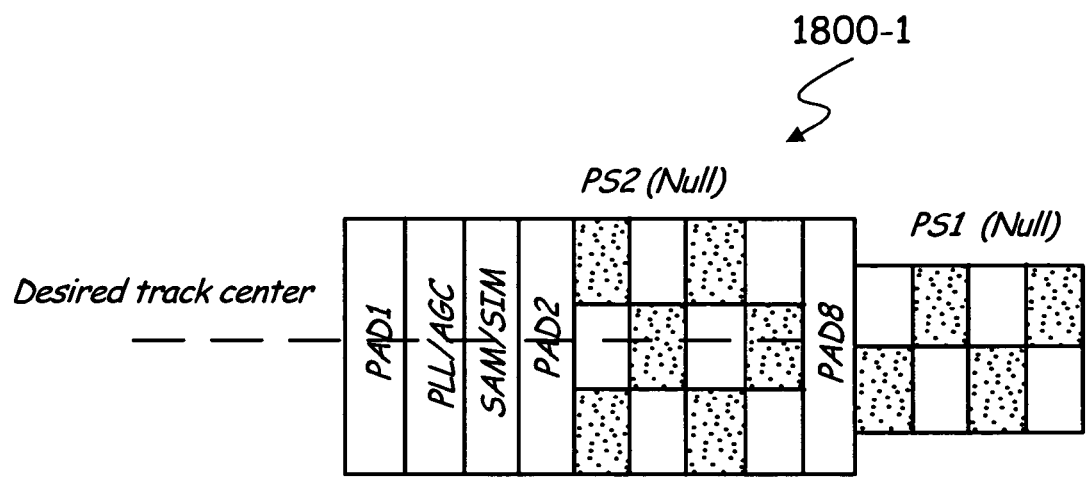
Figures 2, 18:
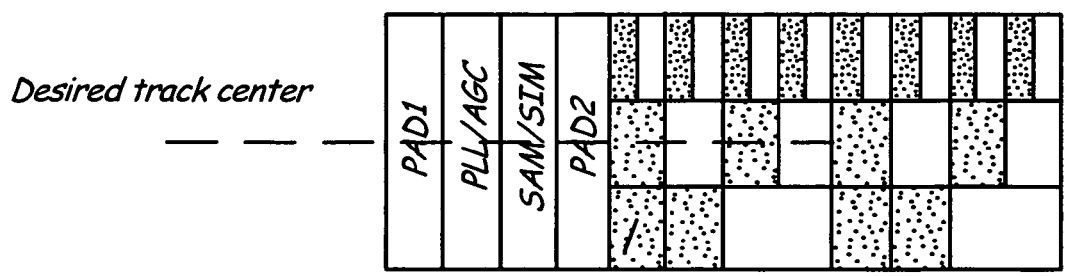

For this specific example, it is proposed that the fields 1700 shown in FIG. 17 are written to the permanent marks. It is also proposed that additional PS bursts be written to the permanent marks in FIG. 17. The additional burst fields 1702 and 1704 are included to update an absolute sensor look-up table, if desired. This will be clearer further below where the servo demodulation algorithm corresponding to these specific servo marks is discussed. The servo fields to be written on the erase readback marks can be written in accordance with either of the two options shown in FIG. 18. The first option (1800-1 shown in FIG. 18-1) is similar to the ones written on the permanent marks, and therefore use similar simple PES extraction functionality used for permanent marks.

However, once read and erased, this pattern requires 4 passes to write it completely back. The second option (1800-2 shown in FIG. 18-2) requires only two passes to write it completely back to the erase readback media, however, it requires more circuitry (two more band-pass filters for each servo frequency at neighboring tracks and for each tip). One of the two can be chosen according to the cost-performance trade-off for a given probe system.

Servo demodulation in such embodiments can be carried out as follows:

1) The AGC gain and sampling instances are adjusted, and SAM and Track ID fields are detected.
   a) Absolute sensors are used to locate the probe tip assembly to the desired location. The absolute sensor value is stored at that moment to memory.
   b) The PLL/AGC fields both in permanent and erase readback marks are processed to obtain the estimates for the AGC gain and sampling instances for each tip.
   c) The sampling instance estimates of each tip associated with the erase readback mark are compared with that associated with the permanent mark. The thermal expansion amount is esmated relative to permanent marks, and the thermal expansion effect is compensated on each sampling instance estimate.
   d) The average of the individual estimates is taken to find the resultant estimate for the AC gain and sampling instances.
   e) SAM written on both the permanent and erase readback marks is detected.
   f) If all the SAM fields are detected, then the Track ID fields are processed in permanent marks to locate the probe tip assembly within ± half a track range of the desired track center. Then, the next step, which is processing the PS bursts, is performed.
   g) If not all the SAM fields are deteed, then this information is sent to the controller. Then, servo demodulation operations are halted.
2) PS bursts are processed.
   a) PS1 and PS2 fields are processed in permanent mark locations to obtain $PES_n^{permanent-i}(\epsilon)$ and $PES_q^{permanent-i}(\epsilon)$ for each tip i associated to permanent servo marks.
   b) If the variation of $PES_n^{permanent-i}(\epsilon)$ (and similarly $PES_q^{permanent-i}(\epsilon)$) is larger than a predefined given threshold, this information is sent to the controller, and the servo demodulation operations are halted. Otherwise, the operations are continued. Those two numbers are averaged over tips get one pair of $PES_n^{permanent}(\epsilon)$ and $PES_q^{permanent-i}(\epsilon)$ corresponding to permanent marks. Any suitable method can be used to obtain confidence levels for each tip to help averaging.
   c) $PES_n^{permanent}(\epsilon)$ and $PES_q^{permanent}(\epsilon)$ are processed to obtain one $PES_n^{permanent}(\epsilon)$ number for permanent marks.
   d) The above items for erase readback marks are repeated to get one $PES^{eraseRB}(\epsilon)$ number, this time for erase readback marks.
   e) $PES^{permanent}(\epsilon)$ and $PES^{eraseRB}(\epsilon)$ signals are compared.
      If the difference is larger than a threshold, this information is sent to the controller, and the servo demodulation operations are halted.
      If the difference is smaller than the threshold, the two signals are averaged to obtain $PES(\epsilon)$ which indicates the final head assembly position for the system
3) RRO information is extracted.
   a) An assumption is made that all necessary and sufficient RRO information has been precalculated and written only to permanent marks.
   b) For each active tip corresponding to permanent marks, either W-RRO or R-RRO information is extracted based on whether a write or a read operation is carried out A similar method as implemented in disc drive servo demodulation architecture is utilized.

c) The RRO information for each tip is averaged in a manner as explained earlier.
d) The RRO information is incorporated to the location of the overall probe tip assembly.
4) An absolute sensor look-up table is updated.
a) At the end of RRO field, the servo operation ends, and the probe tips start processing user data written at erase readback marks. During that time, processing the extra PS bursts written at the permanent marks is continued.
b) $\text{PES}_n^{permanent}(\epsilon)$ and $\text{PES}_q^{permanent}(\epsilon)$ obtained from each PS burst are averaged out until each probe tip processes the data within their range.
c) The final head position is estimated using the final averages of the PES signals.
d) The RRO effects are incorporated to this averaged number to find the location of the overall probe tip assembly with an increased precision.
e) The final estimate is compared to the location of the head assembly obtained from absolute sensor look-up table.
   If the difference of these two numbers is not within a threshold, the absolute look-up table value is updated.
   If the difference is off by a relatively large margin, this information is sent to the controller and operations are halted.
5) The erase readback marks are written back to the media.
a) The $\text{PES}^{eraseRB}(\epsilon)$ signal is extracted using the erase readback marks written at the end of the ranges of each tip in FIG. 15.
b) The extracted $\text{PES}^{eraseRB}(\epsilon)$ signal is compared with the high precision position estimation used to update the absolute sensor look-up table.
   If the difference of these two numbers are not within a threshold, the user data and servo fields are written back to the media. The servo fields may need more than one pass.
   If the difference is off by a relatively large margin, this information is sent to the controller and operations are halted. This concludes the itemized explanation of the servo demodulation functions for this example.

As mentioned above in connection with FIG. 18, several erase readback storage schemes would require two or more passes to rewrite the servo patterns after every read operation. However, data rate requirements and thermal drift limit the number of head passes which can be used to rewrite the servo marks after a read operation. Therefore, servo marks written on the media surface need to be patterned and utilized in such a manner that they can be rewritten after every read operation with only one write pass of the head.

As mentioned above, absolute sensors between the head and media wafers can provide accurate feedback. However, absolute sensors suffer from direct current (DC) drift and hence are not reliable as a sole source of sensing. Furthermore, they do not capture the relative motion between heads in the probe array that may occur due to stick-slip friction or non-uniform thermal expansion.

Some of the present embodiments reduce the number of head passes by utilizing an on-track servo burst of sufficient length that two discrete and accurate readings can be taken within a single field for each track. Then by providing a small positioning excitation during the movement of the sensor over the positioning burst, a directional positioning signal can be extracted without the use of off track bursts. Then, given that the servo burst and the data are on track, they can both be rewritten with a single pass of the sensor. This scheme assumes that the head is already positioned to within the target track. The positioning may be accomplished with absolute sensor feedback if the sensor drift is small enough or with written-in track identification information.

Figure 19:
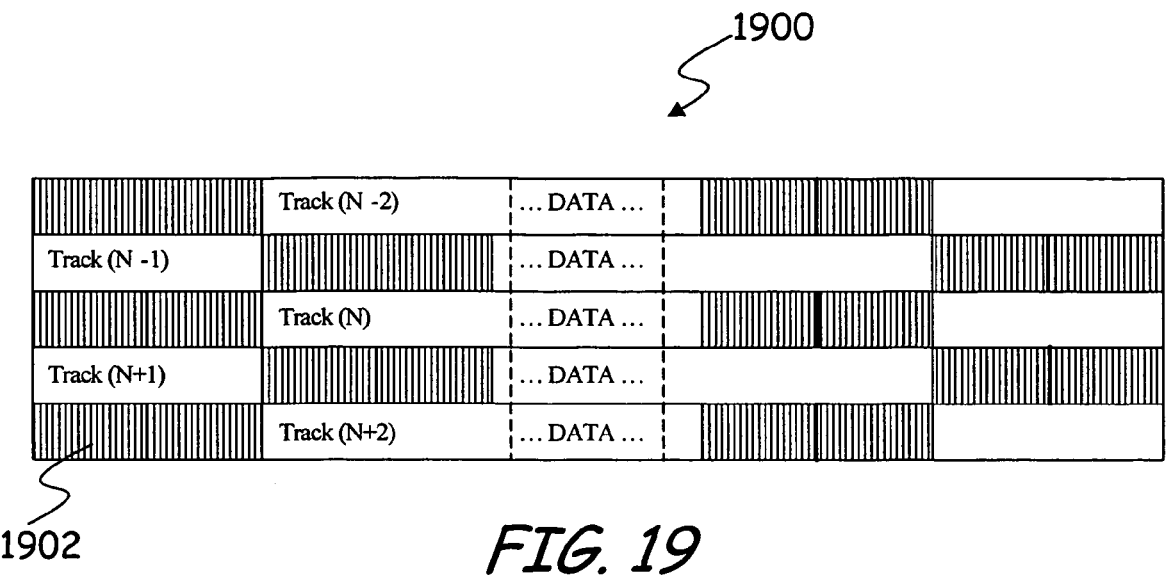
FIGS. 19 and 20 are simplified block diagrams of servo sector fields written to erase readback marks in a probe storage system.
Figure 20:
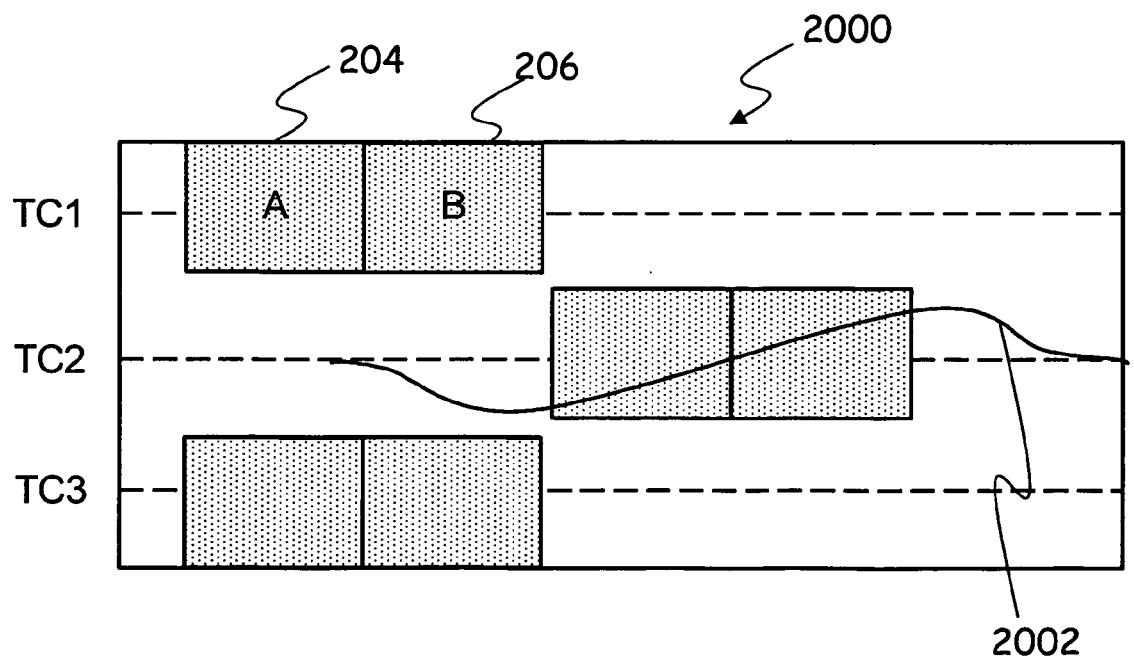

The description provided below in connection with FIGS. 19 and 20 covers a servo pattern that may be used to provide servo-positioning feedback in conjunction with absolute head/media sensors. The pattern is constructed to minimize the latency due to rewrites of the pattern and data. FIG. 19 shows the overall scheme 1900 of the pattern to be used for a single read/write head. The pattern is placed at the beginning of a data track to calibrate the absolute sensor prior to reading or writing data. The pattern may additionally be embedded within data thereafter if required. Embedded servo marks are represented by reference numeral 1902. FIG. 20 illustrates the tracking procedure 2000 using only one track 2002. The challenge lies in being able to sense the polarity of the servo signal while only using a pseudo on-track signal. The solution is achieved by providing a small excitation to the sensor as it is passing over the servo area. Even though burst A (204) and burst B (206) are on-track, by comparing the relative values produced in each field, a directional error signal can be produced according to the following algorithm which is similar to a traditional split burst algorithm.

$$\text{PES}=(\text{Burst B}-\text{Burst A})/(\text{Burst B}+\text{Burst A}) \qquad \text{Equation 2}$$

When the sensor crosses the center line at the midpoint, a PES value of zero results. When the sensor crosses the center line at a point towards the negative track direction, a negative PES value proportional to the offset results. Lastly, when the sensor crosses the center line at a point towards the positive track direction, a positive PES value proportional to the offset results.

Utilizing a gated readback along with the absolute sensor for coarse positioning or written-in track identification within +/− half of a track, each set of servo bursts can be read without erasing its neighboring set of servo bursts. Then the original set of servo bursts can be rewritten along with the data in a single pass.

If the SNR of the probe readback sensor is assumed to be on order with magnetic readback then the length of the servo bursts can be estimated based on the traditional techniques. The excitation signal could be a smoothed ramp signal to provide improved linearity along the bursts while not exciting high frequency actuator modes.

In general, assuming that the probe storage signals will not be very different than those obtained from magnetic recording systems, the only additional cost of the servo demodulation block for probe storage will come from incorporating multi signals coming from multiple probe tips. However, this is assumed to add a small difference in implementation cost although there can be a benefit from multi signaling property of probe storage in terms of both performance and reliability. For example, averaging the position error signals coming from each tip will reduce the effects of random noise in the system, and will result into increase in system performance in presence of noise. On the other hand, utilizing a quality of service deter or a confidence level for position error signal for each tip to implement a weighted averaging will increase the system reliability. Thus, the presence of more than one signal will be an advantage in terms of cost, performance and reliability of the servo demodulator.

The greatest difference in cost, performance, and reliability will be effected by:

- The cost of producing a media with permanent marks in addition to the erase readback ferroelectric media envisioned for probe data storage.
- The cost of producing another array of probe tips which can read data from permanent marks in addition to a matrix of probe tips designed for erase readback marks.
- The precision of the absolute sensors in the system.
- The reliability of reading from and writing to the erase readback marks.

However, whichever system is chosen for a given application, a servo demodulation architecture can be chosen among the ones presented above, which yields favorable performance, cost and reliability trade-off for the overall system.

In summary, the earlier-listed differences between disc drive and probe storage architectures resulted into the following new servo demodulation alternatives for probe storage:

- The extra servo fields at the end of the ranges of the probe tips (i.e., bidirectional servo fields) help in extracting the servo information for writing the erase readback data or servo marks while traveling in the opposite direction of reading. Having the scanning done along a straight line instead of by spinning also helps in eliminating SIM in servo sectors, improving format efficiency while reducing the demodulation functionality as no differentiation between SAM and SIM is necessary.
- The existence of absolute sensors in some embodiments helps relax the seek functionality or completely eliminate it. More specifically, smaller or no Track ID fields are needed (which help improve format efficiency) and less or no processing for detecting Track ID fields is required (which reduces the implementation cost).
- Multiple signals from multiple probe tips allow averaging, which reduces the noise effects in the system making the entire design more reliable.
- The option of having erase readback signals increases the need for reliability. Specifically, in such embodiments, halting the servo demodulation operations whenever an inconsistency is detected will be necessary in order to reduce the possibility of destroying the written information, thus increasing the system reliability.

It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed. For example, the particular elements may vary depending on the particular application for the data storage system while maintaining substantially the same functionality without departing from the scope and spirit of the present embodiments. In addition, although the preferred embodiment described herein is directed to position of a head array in a data storage system, it will be appreciated by those skilled in the art that the teachings of the present embodiments can be applied to other systems that utilize head positioning, without departing from the scope and spirit of the present embodiments.

What is claimed is:

1. A data storage system comprising:
   a data storage medium configured to store servo marks and data marks, the data storage medium having tracks that are divided into sectors;
   an array of heads configured to interact with the data storage medium; and
   a demodulation circuit, which receives servo signals obtained by at least some heads of the array of heads and computes a resultant servo signal, which is used to adjust a position of the array of heads over the storage medium.

2. The data storage system of claim 1 wherein the servo marks comprise permanent servo marks, which are written to the data storage medium by at least some heads of the array of heads.

3. The data storage system of claim 2 wherein at least some of the sectors are dedicated servo sectors, which include the permanent servo marks.

4. The data storage system of claim 2 wherein at least some of the sectors are embedded servo sectors, which include the permanent servo marks and the data marks.

5. The data storage system of claim 1 wherein the data marks are permanent data marks.

6. The data storage system of claim 1 wherein the data marks are erase readback data marks.

7. The data storage system of claim 6 wherein at least some of the erase readback data marks are written between a first set of servo marks and a second set of servo marks, the second set of servo marks being a mirror image of the first set of servo marks.

8. The data storage system of claim 1 wherein the array of heads comprises absolute sensors.

9. The data storage system of claim 8 wherein the servo marks comprise permanent servo marks and the data marks comprise permanent data marks, and wherein at least some of the sectors are embedded servo sectors, which include the permanent servo marks and the permanent data marks.

10. The data storage system of claim 9 wherein the permanent servo marks span a subset of tracks spanned by each head of the plurality of heads.

11. The data storage system of claim 10 wherein a number of tracks in the subset of tracks spanned by each head that the permanent servo marks span is a function of a precision level of the absolute sensors.

12. The data storage system of claim 10 wherein a number of tracks in the subset of tracks spanned by each head that the first set of servo marks and the second set of servo marks span is a function of a precision level of the absolute sensors.

13. The data storage system of claim 8 wherein the servo marks comprise erase readback servo marks and the data marks comprise erase readback data marks, and wherein at least some of the sectors are embedded servo sectors, which include the erase readback servo marks and the erase readback data marks.

14. The data storage system of claim 13 wherein at least some of the erase readback data marks are written between a first set of servo marks and a second set of servo marks, the second set of servo marks being a mirror image of the first set of servo marks.

15. The data storage system of claim 14 wherein the first set of servo marks and the second set of servo marks span a subset of tracks spanned by each head of the plurality of heads.

16. The data storage system of claim 1 wherein a first set of the servo marks comprise permanent servo marks and a second set of the servo marks comprise erase readback servo marks.

17. The data storage system of claim 1 wherein the demodulation circuit comprises a majority decoder for sector address mark and Gray coded track identification.

18. The data storage system of claim 1 wherein the demodulation circuit comprises a majority decoder for extracting a single repeatable runout value.

19. The data storage system of claim 1 wherein the demodulation circuit comprises a weighted averaging module for extracting a resultant position error signal.

20. The data storage system of claim 1 wherein the servo marks are written back along with the data marks in a single pass.

* * * * *